United States Patent [19]

Tomii et al.

[11] 4,292,284
[45] Sep. 29, 1981

[54] SOLVENT EXTRACTION RECOVERY PROCESS FOR INDIUM

[75] Inventors: Keishi Tomii, Funabashi; Hideyuki Tsuchida, Annaka, both of Japan

[73] Assignee: Toho Aen Kabushiki Kaisha, Tokyo, Japan

[21] Appl. No.: 153,271

[22] Filed: Jun. 27, 1980

[51] Int. Cl.³ .......................................... C01G 15/00
[52] U.S. Cl. ................................. 423/112; 423/100; 423/139; 423/DIG. 14; 423/89; 75/101 BE
[58] Field of Search .............. 423/112, DIG. 14, 100, 423/139; 75/101 BE

[56] References Cited

PUBLICATIONS

Golinski, "Proceedings of the International Solvent Extraction Conference", vol. 1, 1971, paper #55, Soc. of Chemical Industry, London.

Levin et al., "Doklady Academii Nauk SSSR", vol. 139, 1961, pp. 158–159, (pp. 1–5 of translation).

Duyckaerts et al, "Proceedings of the International Solvent Extraction Conference", vol. 1, 1977, pp. 73–86.

Primary Examiner—Herbert T. Carter
Attorney, Agent, or Firm—Gerald Levy

[57] ABSTRACT

Indium is recovered effectively from an aqueous leached solution containing indium ions, together with other ions such as ferric ions, zinc ions, etc. if any, by adjusting the pH of the aqueous solution to 0.25–4.5, extracting the indium ions from the aqueous solution with an organic solvent solution formed by diluting an extraction reagent containing a monoalkylphosphoric acid and/or a dialkylphosphoric acid and a trialkylphosphoric acid in 1:2–5 by volume ratio with a phase-stabilizing water-immiscible organic solvent and then back-extracting the indium ions in the organic solvent solution with an aqueous sulfuric acid solution.

6 Claims, 4 Drawing Figures

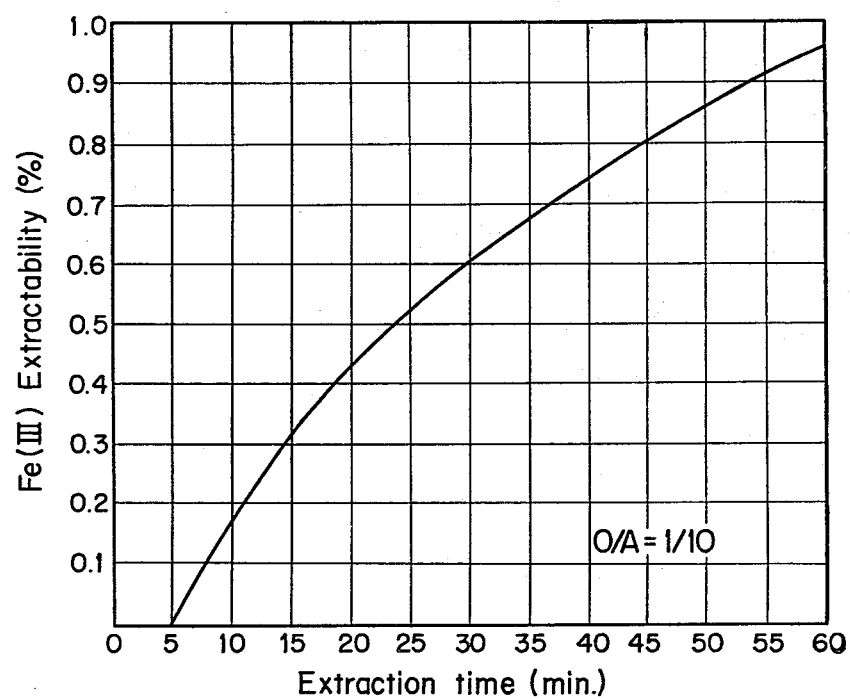

SOLVENT EXTRACTION RECOVERY PROCESS FOR INDIUM

BACKGROUND OF THE INVENTION

1. Field of the Invention

This invention relates to a process of recovering indium and, more particularly, to a process of obtaining indium by selectively extracting indium ions from an aqueous solution containing indium ions by a liquid-liquid ion-exchange process and then back-extracting the indium ions into an aqueous solution acidified by sulfuric acid.

2. Description of the Prior Art

Indium does not occur as ores for itself but exists in very small quantities in ores mainly for zinc and lead. Therefore, an industrial raw material for indium is mainly an intermediate product containing concentrated indium by-produced in a smelting step for zinc, etc., from the ores described above. A general process of recovering indium includes a wet process wherein a raw material for indium, i.e., the above-described intermediate by-product is leached by a mineral acid, etc., and an indium component in the leached solution is separated from components of other metals and purified into a concentrated form. As a conventional wet process, there are a neutralization process for the leached solution, an ion-exchange process, and a liquid-liquid ion-exchange process.

The neutralization process is mainly composed of a technique precipitating indium hydroxide from an aqueous leaching solution of the above-described ores but since the product obtained by such a process is poor in purity, it is required for obtaining the commercial grade product to repeat the purification of the indium product composed of many steps such as a crude neutralization, filtration, dissolution, copper removal, neutralization for purification, etc., and hence the process is complicated and lacking in economical value.

The ion-exchange process uses an ion-exchange resin but in the process the separation efficiency between indium and iron is poor and the concentration ratio of indium is low. Furthermore, since the process requires a high concentrated acid solution containing hydrochloric acid or a halide such a chloride for eluting indium from the ion-exchange resin, the process is unsuitable for the treatment of indium-containing solution employed in a general wet-system zinc smeltery. In other words, intermixing of a halide or a halogenic acid in the wet-system zinc smelting system (sulfuric acid system) causes various troubles in the zinc electrolysis step and others.

The liquid-liquid ion-exchange process is a solvent extraction process using an organic solvent immiscible with water and as the organic soluvent used for the process, there are known ether, isobutyl methyl ketone (MIBK), tributylphosporic acid (TBP), a tertiary fatty acid, a monoalkylphosphoric acid, and a dialkylphosphoric acid.

The ether extraction process and MIBK extraction process among the liquid-liquid ion-exchange processes described above cannot be applied to the extraction of indium from a sulfuric acid-acidic solution containing indium but an aqueous halogenic acid solution containing indium is mainly treated by these processes. There are problems in the application of these processes to a general wet-type zinc smelting system. Also, in these processes there is a fault that a large amount of ether or MIBK is dissolved in an aqueous solution treated, which results in increasing the loss of the solvent as well as causing a problem that the solvent dissolved in the aqueous solution gives bad influences on other steps.

The tributylphosphoric acid (TBP) extraction process is mainly employed for the extraction of indium from a hydrochloric acid-acidic solution since the extraction efficiency of indium from a sulfuric acid-acidic solution by the process is very low and the process is relatively widely used in the field without causing the dissolution of the solvent in the aqueous solution. However, the solvents also extract all metals which are able to form chlorocomplex salts and hence in order to recover indium alone, additional positive separation steps are required, which restricts the utilization of the process.

The extraction process using a tertiary fatty acid can be applied to extract indium from aqueous solution other than an aqueous halogenic acid-acidic solution, such as an aqueous sulfuric acid-acidic solution but since the solvent extracts ferric ions ($Fe^{3+}$) more preferentially than indium ions, it is necessary to previously reduce ferric ions existing in the aqueous solution into ferrous ions ($Fe^{2+}$). Also, the pH at which the solvent extracts indium is limited to a relatively narrow whole range of 2.5–3.5 and the separation efficiency of indium from other heavy metal ions is low, the purity of indium in a back-extracted solution obtained tends to be easily reduced. Consequently, for purifying the back-extracted solution, other process such as the above-described TBP extraction process must be also employed together.

By the conventional extraction process using a monoalkylphosphoric acid and/or a dialkylphosphoric acid, indium ions can be recovered by extraction from an aqueous solution thereof having a relatively high sulfuric acid concentration, i.e., the aqueous sulfuric acid solution (sulfuric acid content of 500–12 g/liter) having a pH of $-1.0$ to 0.6 pH as shown in FIG. 1 of the accompanying drawings. FIG. 1 is a graph showing the extraction equilibriums of indium ions, ferric ions and zinc ions in the case of mixing 100 ml of each aqueous sulfuric acid-acidic solution having each different sulfuric acid concentration containing 525–588 mg/liter of indium ions ($In^{3+}$), 122–225 mg/liter of ferric ions ($Fe^{3+}$) and 246–250 mg/liter of zinc ions ($Zn^{2+}$) with 100 ml of each organic solvent solution comprising a mixture of di(2-ethylhexyl)phosphoric acid (D2EHPA) and a paraffinic organic solvent, MSB 210 (trade name, made by Shell Chemical Co.) in 5:95 by volume ratio as an extracting solution. In FIG. 1, the axis of ordinate indicates the extractability and the axis abscissa the pH of a sulfuric acid-acidic solution.

As is understood from the figure, under the pH condition for extracting indium ions in the above-described process, ferric ions are simultaneously extracted and hence it must be considered to previously reduce the ferric ions dissolved in an aqueous solution to ferrous ions. However, it is not always easily to completely reduce the ferric ions in an aqueous solution, the accumulation of ferric ions in the solvent repeatedly used in practical step is unavoidable, and hence the employment of back-extraction or stripping must be considered. For the back-extraction of ferric ions from an extracted solvent solution, an aqueous sulfuric acid-acidic solution cannot be substantially used and hence a halogenic solution, intermixing of which in an indium extraction system is undesirable, must be employed at present in a wet-system zinc smeltery as described above. Furthermore, the back-extraction of indium ion itself requires two kinds of halogenic acid solutions each having different concentration and thus, two stages of back-extraction steps for ferric ions and indium ions are ultimately required.

SUMMARY OF THE INVENTION

The inventors have found that a mixed solvent of a monoalkylphosphoric acid and/or a dialkylphosphoric acid and a trialkylphosphoric acid in a definite ratio has an extracting property for heavy metal ions and a back-extractive property which have never been attained in case of using the monoalkylphosphoric acid, dialkylphosphoric acid, or trialkylphosphoric acid individually and have discovered the present invention as the result of investigations on the utilization of the properties of the solvent mixture for the effective recovery of indium from an aqueous solution containing indium.

The object of this invention is, therefore, to provide a process of obtaining a pure indium concentrate by a liquid-liquid ion-exchange process wherein indium ions are effectively extracted with an organic solvent solution from an aqueous solution containing indium ions and back-extracting the indium ions with an aqueous sulfuric acid-acidic solution.

Thus, according to this invention, there is provided a process of recovering indium including the steps of adjusting the pH of an aqueous solution containing indium ions to 0.25-4.5, mixing the aqueous solution with an organic solvent solution prepared by diluting an extracting reagent containing a monoalkylphosphoric acid and/or a dialkylphosphoric acid and a trialkylphosphoric acid in 1:2-5 by volume ratio with a phase-stabilizing water-immiscible organic solvent to extract the indium ions into the organic solvent solution, and then mixing the organic solvent solution with an aqueous sulfuric acid-acidic solution containing 100-500 g/liter of free sulfuric acid, thereby the indium ions are back-extracted from the organic solvent solution into the aqueous sulfuric acid-acidic solution to provide a pure aqueous sulfuric acid-acidic solution containing indium in concentrated state.

BRIEF DESCRIPTION OF THE DRAWINGS

FIG. 3 and FIG. 4 are graphs showing the relation between the extractabilities of $In^{3+}$ and $Fe^{3+}$ respectively from an aqueous sulfuric acid solution by the organic solvent solution of this invention and the extraction time required for the extractions.

DESCRIPTION OF THE PREFERRED EMBODIMENT

The term "monoalkylphosphoric acid" and/or "dialkylphosphoric acid" includes an alkylpyrophosphoric acid, a monoalkylphosphinic acid, and a dialkylphosphinic acid in addition to a monoalkylphosphoric acid and a dialkylphosphoric acid, and it is preferred as an oil-soluble compound that the molecular weight of the alkyl substituent be sufficiently large and the carbon number thereof be 8-20.

Practical examples of the preferred monoalkylphosphoric acids or dialkylphosphoric acids used in this invention are di(2-ethylhexyl)phosphoric acid (D2EHPA), di(1-methylheptyl)phosphoric acid, 2-ethylhexylpyrophosphoric acid, octylpyrophosphoric acid, 1,2-methylpropyl-3,5-dimethylhexylphosphoric acid, 2-ethylhexylphosphoric acid, and mixtures of the above-described organic phosphoric acids.

The trialkylphosphoric acids used in this invention include a trialkylphosphate, a trialkylphosphine oxide, an alkyldialkylphosphinate, and a dialkylalkylphosphonate. It is preferred that the carbon number of the alkyl substituent be 4-8. Practical examples of the preferred trialkylphosphoric acid are tributylphosphoric acid (TBP), trioctylphosphoric acid, tripentylphosphoric acid, trihexylphosphoric acid, triheptylphosphoric acid, dibutylbutyl phosphonate, butyldibutyl phosphinate, and mixtures of them.

The extraction reagent containing the above-described organic phosphoric acids is diluted by a phase-stabilizing water-immiscible organic solvent. The diluting solvent is insoluble in water and acts to stably dissolve an organic phosphoric acid and an organic phosphorus compound and reduce the viscosity thereof. Other necessary factors for solvent are chemical stability, low toxicity, and high flash point. That is, there are aliphatic hydrocarbons, aromatic hydrocarbons, and alkylaromatic hydrocarbons induced from peteroleum sources. Practical examples of the solvent are toluene, xylene, kerosene, various flash naphtha cuts, and mixtures of them but a particularly preferred solvent is a deodorized mineral spirit which is a mixture of higher paraffin hydrocarbons. (Commercially available solvents used in this invention are MSB 210, MSB 210L, DOSB, DOSB-X, HAWS, Shell Sole A, Shell Sole AB, Eskaid 100, etc., and trade names, made by Shell Chemical Co.).

The properties of the organic solvent solution (hereinafter, referred to as "organic phase A") formed by diluting the extraction reagent with the above-described organic solvent are described below in detail.

Figure 1:
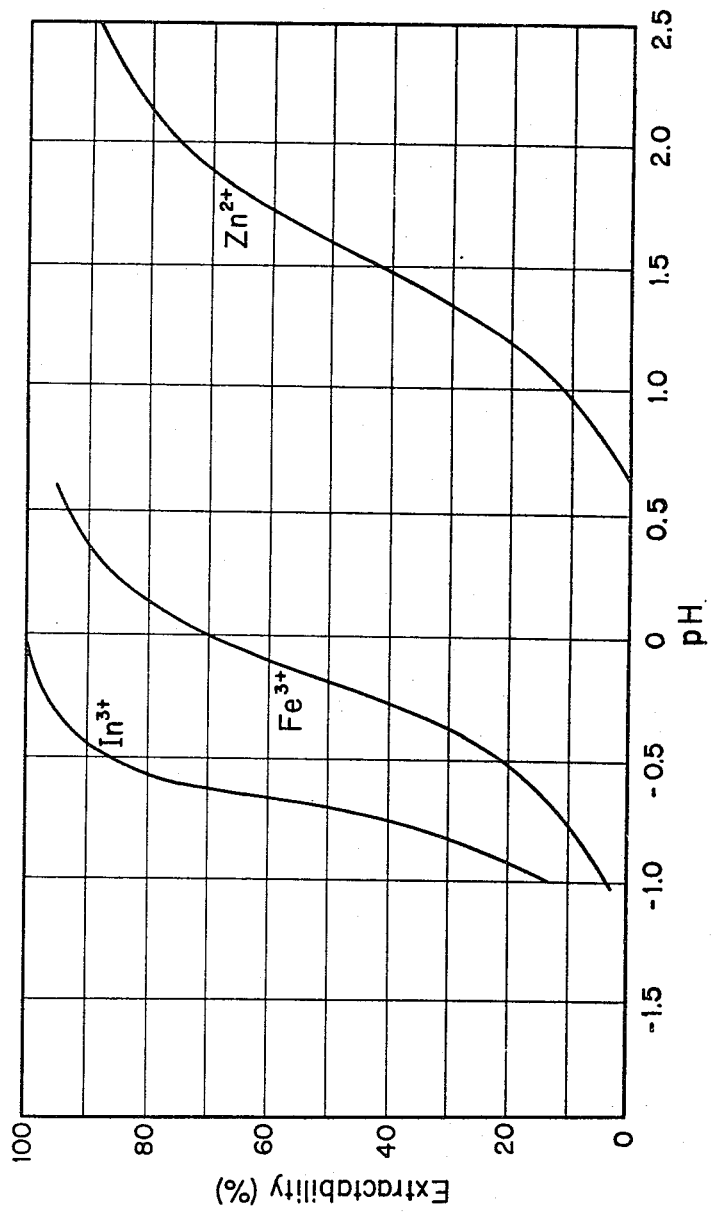
FIG. 1 is a graph showing the extraction equilibrium curves of $In^{3+}$, $Fe^{3+}$, and $Zn^{2+}$ from an aqueous sulfuric acid solution by a D2EHPA solvent solution.
Figure 2:
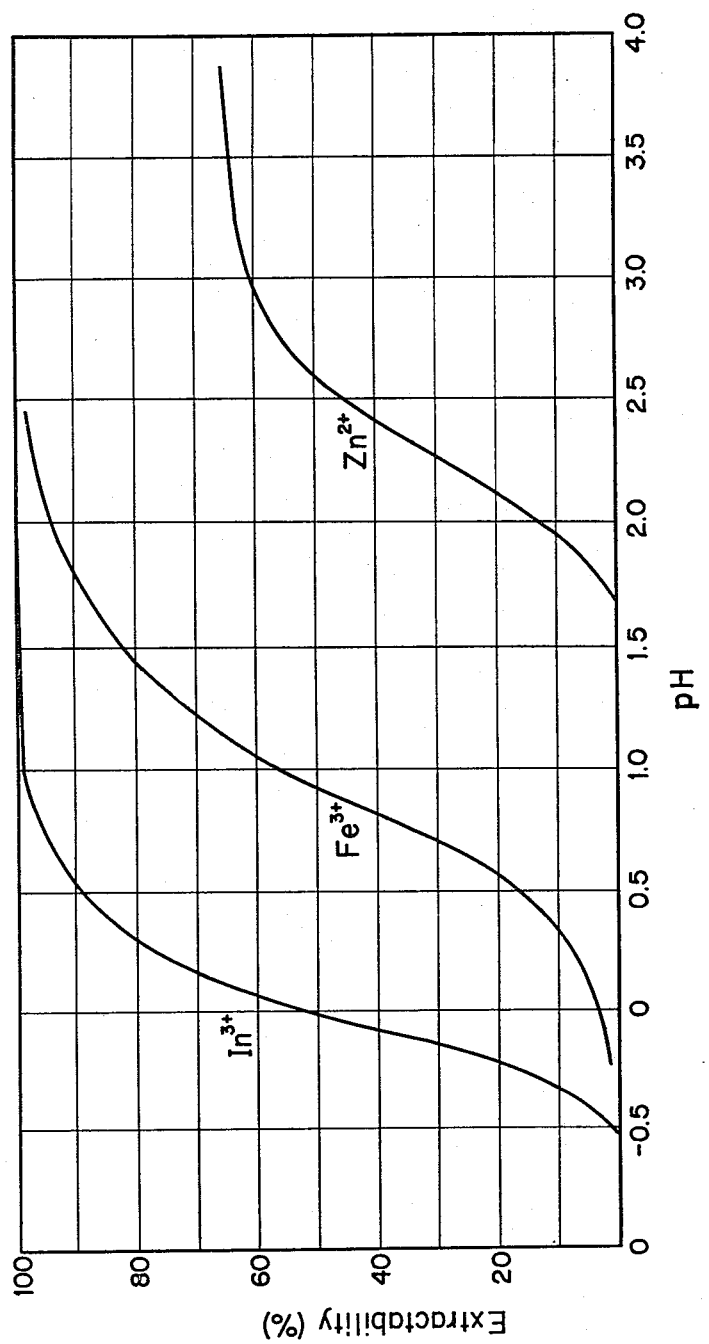
FIG. 2 is a graph showing the extraction equilibrium curves of $In^{3+}$, $Fe^{3+}$, and $Zn^{2+}$ from an aqueous sulfuric acid solution by the organic solvent solution in this invention.

FIG. 2 is a graph showing the extraction equilibrium of indium ions ($In^{3+}$), ferric ions ($Fe^{3+}$), and zinc ions ($Zn^{2+}$) by the organic phase A in the experiment of this invention. The equilibrium curves are in the case of mixing 100 ml of each aqueous sulfuric acid solution containing 478-613 mg/liter of $In^{3+}$, 60-225 mg/liter of $Fe^{3+}$, and 246-250 mg/liter of $Zn^{2+}$ with 100 ml of an organic phase A formed by mixing di(2-ethylhexyl)phosphoric acid (D2EHPA), tributylphosphoric acid (TBP), and solvent paraffin MSB 210 (trade name, made by Shell Chemical Co.) in 3:12:85 by volume ratio and the axis of ordinate indicates extractability and the axis of abscissa the pH value of an aqueous sulfuric acid-acidic solution As is shown in FIG. 2, the organic phase A shows a substantial indium extraction effect at pH higher than 0.25. Also, indium ions precipitate as the hydroxide at pH higher than 4.5 and hence the upper limit in the liquid-liquid ion-exchange for indium is pH 4.5. That is, the pH range for the extraction of indium by the organic phase A is 0.25-4.5. The pH range is shifted to a lower acid side than the pH range for the extraction of indium in the case of using a monoalkylphosphoric acid or dialkylphosphoric acid alone and hence the extraction treatment can be performed easily. The particularly remarkable feature of the organic phase A is that it has a selective extracting property for indium ions and the use of an aqueous sulfuric acid solution for the back-extraction of indium ions becomes possible by the use of the organic phase A of this invention as will be described later, thereby the practicability of the solvent extraction can be greatly increased.

It is preferred that the mixing ratio of a monoalkylphosphoric acid or a dialkylphosphoric acid to a trialkylphosphoric acid in the organic phase A used in this invention be 1 to 2-5. If the proportion of the trialkylphosphoric acid is higher than the mixing ratio, the extracting property for indium ions reduces, while if the proportion is lower than the mixing ratio, the back-extracting property by an aqueous sulfuric acid solution reduces. In either case, the use of such organic solvent solution causes undesirable problems.

Also, as is clear from FIG. 2, the organic phase A does not extract zinc ions at pH lower than 1.5 and hence when an aqueous solution contains zinc ions together with indium ions, indium ions only can be extracted by selecting the pH range for the extraction to 0.25-1.5.

an indium raw material usually contains iron, in particular iron in ferric state in addition to zinc and the aqueous leached solution thereof contains ferric ions. The separation of the ferric ions and indium ions can be easily practiced in the pH range of this invention, which is one of the novel features of this invention.

As is clear from the extraction equilibrium curves of indium ions and ferric ions in FIG. 2, the extracting property for ferric ions becomes greatly poor in the organic phase A when the pH of the aqueous solution is lower than 1.0, in particular, lower than 0.7 and hence indium ions can be selectively extracted in the pH range of 0.25-1.0, preferably 0.25-0.7.

The results shown in FIG. 2 are in equilibrium states and in practical extraction the extraction rates also take part in the extraction. The organic phase A of this invention possesses a property that the extraction rate for indium ions is far higher than that for ferric ions even in an aqueous solution containing a considerable amount of ferric ions. Therefore, it becomes possible by the use of the organic phase A to substantially completely separate indium ions from ferric ions.

Figure 3:
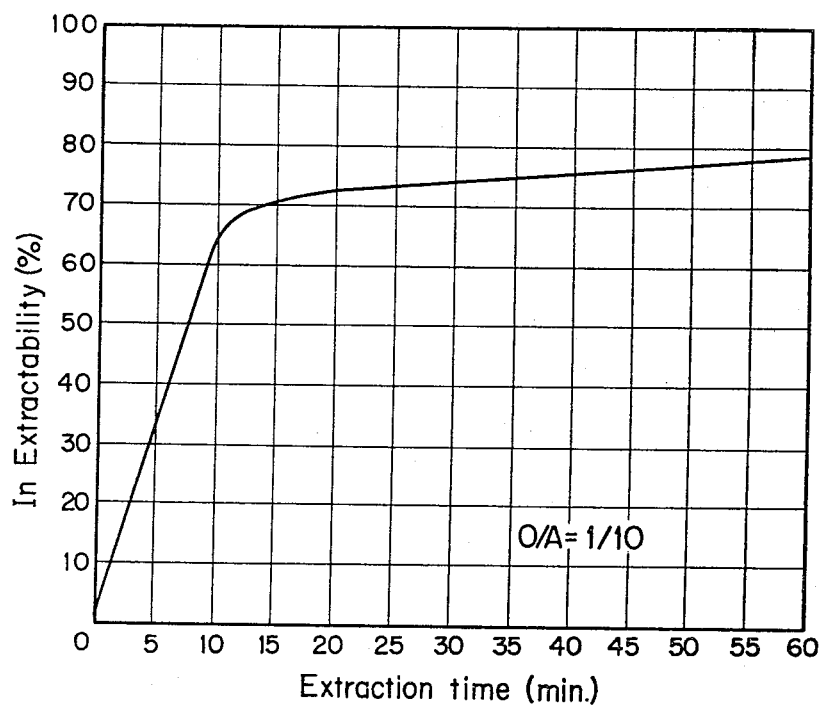

This is clear from FIG. 3 and FIG. 4. FIG. 3 and FIG. 4 are the experimental results made by the inventors, which show the relations between the extraction time and the extractabilities for indium ions and ferric ions in case of using the organic phase A.

The original aqueous solution used for obtaining the above results is 500 ml of an aqueous sulfuric acid-acidic solution having a pH of 0.7 containing 90 mg/liter of $In^{3+}$ and 140-154 mg/liter of $Fe^{3+}$ and the organic phase A as the extracting reagent is 50 ml of an organic solution consisting of 3% by volume D2EHPA, 12% by weight TBP, and 85% by volume MSB 210.

As is understood from these figures, the indium ions are extracted into the organic phase A in an amount of about 60-70% thereof by the mixing contact for 10 minutes, while the ferric ions are not in the least extracted for the first 5 minutes and about 0.2% only of the ions are extracted after the mixing contact of 10 minutes. Furthermore, the extraction rate for ferric ions is low even after then and the extractability for ferric ions after 60 minutes is about 1% only.

As described above, the organic phase A shows an excellent effect for the separation of indium ions from ferric ions by the separability by the extraction equilibrium and the difference in extraction rate and such an effect has never been attained by a conventional organic solvent.

Then, the back-extraction or stripping of indium ions extracted in the organic phase A is explained below.

As described above, the extraction of total indium ions can also be practiced by a conventionally known extracting reagent containing a monoalkylphosphoric acid or dialkylphosphoric acid individually but when the indium ions are back-extracted from the solution using an aqueous sulfuric acid solution, the back-extraction is yet imperfect even using a highly concentrated sulfuric acid solution containing 490 g/liter of sulfuric acid. Also, in the mixing contact with a sulfuric acid solution containing over 500 g/liter of sulfuric acid, a third phase forms between the solvent solution and the sulfuric acid solution to reduce the phase separation and hence an aqueous sulfuric acid-acidic solution cannot substantially be used for the back-extraction of indium ions from the solvent solution. This is also true in case of ferric ions in the solvent solution.

On the other hand, in the case of using the organic phase A, it is possible to almost completely back-extract the indium ions extracted in the organic phase A with an aqueous sulfuric acid-acidic solution and by increasing the treatment cycle times, the back-extraction of indium ions with 100 g/liter (pH −0.3) of an aqueous sulfuric acid-acidic solution becomes possible. In the case of using an aqueous solution of a low proportion of sulfuric acid, it is efficient to operate the process in a multi-stage contact by a counter-current system.

However, even in the case of using the organic phase A, a third phase forms in the mixing contact with an aqueous sulfuric acid-acidic solution containing over 500 g/liter of sulfuric acid as in the case of using a monoalkylphosphoric acid or a dialkylphosphoric acid and hence the concentration of the sulfuric acid-acidic solution used for the back-extraction of indium ions from the organic phase A is in the sulfuric acid range of 100-500 g/liter.

In other words, it is an important feature of this invention that by using the organic phase A as an extracting solution for indium, an aqueous sulfuric acid-acidic solution can be used for the back-extraction of the indium ions from the extracting solution and ultimately, a sulfuric acid-acidic indium concentrate can be obtained, thereby the practicability of the extraction process of indium is greatly improved.

The condition for the sulfuric acid concentration in the back-extraction from the organic phase A is 100-500 g/liter as described above and in the range the back-extracting property of indium ions is better as the concentration of sulfuric acid is as high as possible and also the back-extraction property is better as the ratio of a trialkylphosphoric acid to a monoalkylphosphoric acid and/or dialkylphosphoric acid is higher but if the back-extraction is repeatedly practiced, the back-extraction can be performed effectively even by employing the lower range in each case. In this invention the above-described ratio is defined in the range of 1:2-5 considering the selective extracting property of indium ions from an original aqueous solution containing them and the workability in the repeating back-extraction of indium ions with an aqueous sulfuric acid solution.

Prior to indium ions, the ferric ions in the organic phase A are back-extracted under such a back-extraction condition for indium ions. This means that the organic phase A can be regenerated by the back-extraction treatment with the same sulfuric acid solution, which is one of the merits of this invention.

As described above, since the extracting property for ferric ions with the organic phase A from an original aqueous solution is poor, the amount of ferric ions contained in the organic phase A is very small and hence the amount of ferric ions entering the aqueous sulfuric acid solution in the back-extraction is also very small and the existence of such a small amount of ferric ions gives no bad influences on the practicability of the process of this invention.

In addition, when the recovery of the indium ions from the back-extracted sulfuric acid solution is practiced by a cementation process with aluminum, the ferric ions in the sulfuric acid solution are easily reduced into ferrous ions, which remains, in situ, in the solution, and hence they give almost no bad influences on the purity of indium metal recovered.

The cementation spent solution from which indium has been recovered can be backed, as it is, into the leaching step in a zinc smeltery or indium extraction step. That is, ferrous ions in the cementation spent solution are not extracted in the indium extraction system together with zinc and aluminum, when the solution is returned, and there is no problem about the accumulation of ferrous and ferric ion in the indium extraction system.

Furthermore, as an effect by the liquid-liquid ion-exchange process of this invention using the organic phase A, there is the excellency in separating property of indium ions from other element ions than iron and zinc ions. That is, the process of this invention can be suitably applied to the recovery of indium from an indium-containing solution which contains also other elements than iron and zinc, for example dusts containing such elements as tin, chlorine, fluorine, arsenic, etc., which also means that the process of this invention can be utilized for the recovery of a very small amount of indium.

Among the above-described elements, tin has a strong affinity with indium and the separation of it is very difficult even by other ion-exchange process as well as general chemical treatment. However, the organic phase A extracts almost no tin ions in the condition ranges for extracting indium ions of this invention.

As described above, the organic phase A of this invention improves positively the problems occuring in case of the individual use of a monoalkylphosphoric acid, dialkylphosphoric acid, or trialkylphosphoric acid constituting the organic phase A, i.e., the organic phase A extracts selectively indium ions from an aqueous solution containing the indium ions together with, in particular, ferric ions under the conditions defined in this invention and makes it possible to back-extract the indium ions into an aqueous sulfuric acid solution.

The indium recovery process of this invention can be easily applied to the practical operation without any trouble in addition to the simplification of steps, and hence the significance of the invention is large.

In addition, in the process of this invention, an aqueous sulfuric acid-acidic solution can be used as the back-extracting solution but a leached solution of an indium raw material, i.e., a solution to be treated by the extraction process of this invention is not limited to a sulfuric acid-acidic solution but may be a silicofluoric acid solution, a hydrochloric acid solution, a nitric acid solution or other halogenic acid solution.

Now, the following examples will serve to illustrate the process of this invention.

EXAMPLE 1

While changing the pH of an indium-containing aqueous solution, the extraction test for indium ions was performed.

An aqueous sulfuric acid solution having a pH of 0.70 to −0.30 containing 0.457 g/liter of indium ions was prepared. Also, an organic phase consisting of 10 parts by volume of D2EHPA, 40 parts by volume of TBP, and 40 parts by volume of kerosene was prepared. In a 150 milliliter separatory funnel were placed 50 ml of the aqueous solution prepared above and 50 ml of the organic phase, the mixture was shaken for 5 minutes and then allowed to stand. The raffinate, i.e., an aqueous solution extracted of the extraction rest was separated, the indium concentration in the raffinate was analyzed, and then the extractability of indium ions in the organic phase was determined based on the concentration of indium in the original aqueous solution prepared. The results are shown in Table 1.

TABLE 1

| pH in aq. soln. | In conc. in orig. aq. soln. g/liter | In conc. in raffinate g/liter | Extractability of In in org. phase % |
|---|---|---|---|
| 0.70 | 0.457 | 0.011 | 97.6 |
| 0.60 | 0.457 | 0.014 | 96.9 |
| 0.52 | 0.457 | 0.020 | 95.6 |
| 0.46 | 0.457 | 0.023 | 95.0 |
| 0.40 | 0.457 | 0.0295 | 93.5 |
| 0.35 | 0.457 | 0.040 | 91.2 |
| 0.30 | 0.457 | 0.040 | 91.2 |
| 0.12 | 0.457 | 0.050 | 89.1 |
| 0.00 | 0.457 | 0.060 | 86.9 |
| −0.10 | 0.457 | 0.155 | 66.1 |
| −0.18 | 0.457 | 0.169 | 63.0 |
| −0.24 | 0.457 | 0.235 | 48.6 |
| −0.30 | 0.457 | 0.268 | 41.3 |

That is, the indium extractability obtained was higher than 90% at the pH of the indium-containing aqueous solution of higher than 0.30 and was 98% at the pH of 0.70.

EXAMPLE 2

While changing the ratio of the organic phase to the aqueous sulfuric acid solution containing indium ions and zinc ions, the extraction test was performed.

An aqueous sulfuric acid solution having a pH of 0.60 containing 0.457 g/liter of indium ions and 100 g/liter of zinc ions was prepared and also an organic phase having the same composition as in Example 1 was prepared. While changing the ratio of the organic phase to the aqueous solution (shown by O/A), the extractabilities of indium and zinc in the organic phase were measured by the same ways as in Example 1. The results obtained are shown in Table 2.

TABLE 2

| O/A ratio | Concn. in orig. aq. soln. g/liter | | Concn. in raffinate g/liter | | Extracability in org. phase % | |
|---|---|---|---|---|---|---|
| | In | Zn | In | Zn | In | Zn |
| 0.25 | 0.457 | 100.0 | 0.043 | 100.0 | 90.6 | 0.0 |
| 0.50 | 0.457 | 100.0 | 0.034 | 100.0 | 92.6 | 0.0 |
| 0.75 | 0.457 | 100.0 | 0.025 | 100.0 | 94.5 | 0.0 |
| 1.00 | 0.457 | 100.0 | 0.020 | 100.0 | 95.5 | 0.0 |

That is, at the pH of 0.6 the extractability of indium was increased as the amount of the organic phase brought into contact with the aqueous solution in the range of ¼ to 1/1 was larger. The extractability for indium ions was higher than 90% in each case but the extractability of zinc was 0, which showed the excellent separating property of indium from zinc.

EXAMPLE 3

The back-extraction test of indium from the organic phase containing indium was performed by aqueous sulfuric acid solution for back-extraction while changing the concentration of the aqueous solution.

An organic phase having the same composition as in Example 1 was prepared and the content of indium was 0.424 g/liter. Then, 100 ml of the organic phase were vigorously mixed with 40 ml of a back-extracting solution consisting of an aqueous sulfuric acid solution in a separatory funnel for 5 minutes. The results obtained on the back-extractabilities of the organic phase to back-extracting solution having different sulfuric acid concentrations are shown in Table 3.

TABLE 3

| Concn. of sulfuric acid in back-extracting soln. g/liter | Concn. of In in org. phase g/liter | Concn. of In in extracted soln. g/liter | Back-extrac-tability % |
|---|---|---|---|
| 130 | 0.424 | 0.860 | 84.7 |
| 180 | 0.424 | 0.874 | 94.2 |
| 210 | 0.424 | 1.022 | 96.2 |
| 240 | 0.424 | 1.040 | 96.3 |
| 270 | 0.424 | 1.022 | 96.2 |
| 300 | 0.424 | 1.072 | 100.0 |
| 330 | 0.424 | 1.072 | 100.0 |
| 360 | 0.424 | 1.072 | 100.0 |

That is, the back-extractability by one mixing contact of both solutions was higher than 90% when the concentration of sulfuric acid was higher than 180 g/liter and became 100% when the concentration was over 300 g/liter.

EXAMPLE 4

Back-extraction test was performed while changing the volume ratio (O/A) of a charged organic phase (O) to a back-extracting sulfuric acid solution (A).

A back-extracting solution having a constant sulfuric acid solution of 180 g/liter was used and the composition of an organic phase was same as in Example 1 and the indium concentration in the organic phase was 0.444 g/liter. The stirring period of time for back-extraction was 5 minutes. The results obtained are shown in Table 4.

TABLE 4

| O/A ratio | In concn. in loaded org. phase g/liter | In. concn. in org. phase after back-extn. g/liter | In concn. in back-extracted soln. g/liter | Back extrac-tability % |
|---|---|---|---|---|
| 0.1 | 0.444 | 0.084 | 3.60 | 81.1 |
| 0.2 | 0.444 | 0.032 | 2.06 | 92.8 |
| 0.4 | 0.444 | 0.013 | 1.08 | 97.1 |

That is, indium can be easily recovered with a smaller amount of a back-extracting solution in a concentrated state.

EXAMPLE 5

Repeating test of a back-extraction was performed.

A back-extracting sulfuric acid solution having a constant sulfuric acid concentration of 183 g/liter was used and the mixing volume ratio O/A in the back-extraction was kept at a constant value of 10/1. A back-extractability of indium from the loaded organic phase was measured when the back-extraction was performed thrice.

Each back-extraction was performed for 10 minutes. The organic phase composed of 3 parts by volume of D2EHPA, 12 parts by volume of TBP, and 85 parts by volume of MSB 210 made by Shell Chemical Co. and loaded with 2.36 g/liter of indium. The results are shown in Table 5.

TABLE 5

| Back-extraction repeating no. | 0 | 1 | 2 | 3 |
|---|---|---|---|---|
| Concn. of In in back-extracting soln. g/liter | 0 | 19.0 | 4.60 | 4.60 |
| Concn. of In in org. phase g/liter | 2.36 | 0.46 | 0.00 | 0.00 |
| Integrated back-extractability % | 0 | 80.5 | 10.00 | 10.00 |

That is, when the sulfuric acid concentration of a back-extracting solution is low, a sufficient back-extract could be practiced by repeating the back-extracting operation.

EXAMPLE 6

Indium, zinc and iron were dissolved in an aqueous sulfuric acid solution together with dusts containing fluorine, chlorine, tin and arsenic to provide an aqueous solution having a sulfuric acid concentration of 9.36 g/liter (pH 0.72) and using the organic phase of this invention, a 3 stage counter current continuous extraction was performed by means of a mixer settler. The organic phase used in the back-extraction was composed of 3 parts by volume of D2EHPA, 12 parts by volume of TBP, and 85 parts by volume of MSB 210 made by Shell Chemical Co. The extraction and back-extraction were repeated several times.

The volume of the organic phase prepared was 40 liters and while performing the continuous extraction, sampling was performed when the extraction system reached equilibrium and the samples were analyzed. The results are shown in Table 6.

TABLE 6

| Dust | Flow rate ml/min. | % | Analyzed component | | | | | | | |
| | | | $H_2SO_4$ | In | F | Cl | Sn | As | Fe | Zn |
|---|---|---|---|---|---|---|---|---|---|---|
| | | | | 486 | 1.73 | 8.14 | 1.58 | 7.39 | 1.14 | 9.91 |
| Orig. aq. soln. | 146 | Analytical value | 9.36 | 1.327 | 0.805 | 3.36 | 0.0343 | 2.102 | 0.200 | 4.21 |

TABLE 6-continued

| Dust | Flow rate ml/min. | % | H$_2$SO$_4$ | Analyzed component | | | | | | |
|---|---|---|---|---|---|---|---|---|---|---|
| | | | | In 486 | F 1.73 | Cl 8.14 | Sn 1.58 | As 7.39 | Fe 1.14 | Zn 9.91 |
| Org. phase | 136 | g/liter | | 1.145 | 0.006 | 0.016 | 0.000 | 0.001 | 0.003 | 0.00 |
| Raffinate 1st stage | 146 | | | 0.355 | 0.795 | 3.32 | 0.034 | 2.07 | 0.20 | 4.20 |
| Raffinate 2nd stage | 146 | | | 0.063 | 0.795 | 3.32 | 0.034 | 2.07 | 0.20 | 4.20 |
| Raffinate 3rd stage | 146 | | | 0.000 | 0.795 | 3.32 | 0.034 | 2.07 | 0.18 | 4.20 |
| Loaded org. phase | 136 | | | 1.57 | 0.017 | 0.06 | 0.0003 | 0.035 | 0.025 | 0.016 |
| Loaded org. phase 1st stage | | Extractability | | 73.26 | 1.27 | 0.71 | 0.80 | 1.51 | 0.24 | 0.06 |
| Loaded org. phase 2nd stage | | | | 95.25 | 1.27 | 0.71 | 0.80 | 1.51 | 0.24 | 0.06 |
| Loaded org. phase 3rd stage | | | | 100.00 | 1.27 | 0.71 | 0.80 | 1.51 | 10.22 | 0.06 |

That is, the extractability for iron was about 10% and those for other elements were greatly low, while that for indium was 100%. These results show the sufficient separation effect by the invention.

EXAMPLE 7

An organic phase having the same composition as in Example 6 was loaded by indium and other elements ions as in the same example and then the back-extraction of indium from the loaded organic phase was performed in counter current 3 stages by means of a mixer settler using a sulfuric acid solution.

In addition, the concentration of sulfuric acid in the aqueous solution used in the back-extraction was 305.2 g/liter and the ratio O/A in the back-extraction was 10.75. The results are shown in Table 7.

TABLE 7

| | Flow rate ml/min. | | H$_2$SO$_4$ | Analyzed component | | | | | | |
|---|---|---|---|---|---|---|---|---|---|---|
| | | | | In | F | C | Sn | As | Fe | Zn |
| Loaded org. phase | 175.5 | | | 1.52 | 0.0323 | 0.0762 | 0.0002 | 0.029 | 0.021 | 0.0141 |
| Original back-extracting soln. | 16.32 | Analytical value g/liter | 305.2 | 0 | 0 | 0 | 0 | 0 | 0 | 0 |
| Back-extracting soln. 1st stage | 16.32 | | | 2.78 | 0.1078 | 0.09 | 0.0002 | 0.060 | 0.043 | 0.014 |
| Back-extracting soln. 2nd stage | 16.32 | | | 8.50 | 0.1526 | 0.450 | 0.0002 | 0.160 | 0.135 | 0.047 |
| Back-extracting soln. 3rd stage | 16.32 | | | 14.46 | 0.2580 | 0.820 | 0.0002 | 0.290 | 0.226 | 0.152 |
| Regenerated org. phase | 175.5 | | | 0.175 | 0.0083 | 0.01 | 0.0002 | 0.002 | 0.000 | 0.000 |
| Back-extraction 1st stage | | Back-extractability | | 17.01 | 31.04 | 9.71 | 7.89 | 19.23 | 18.92 | 9.27 |
| 2nd stage | | | | 52.00 | 43.92 | 48.48 | 7.89 | 51.30 | 59.46 | 30.05 |
| 3rd stage | | | | 88.47 | 62.84 | 88.38 | 7.89 | 93.10 | 99.73 | 100.00 |

That is, the back-extractability for tin was low as well as sufficient back-extractions were obtained on other elements, and the recycling use of the organic phase was sufficiently possible. In addition, since the extractability for tin from an original aqueous solution was greatly low and the content thereof in the loaded organic phase was also low, the existence of such a small amount of tin gave substantially less problems.

What is claimed is:

1. A process of recovering indium, comprising the steps of adjusting the pH of an aqueous solution containing indium ions to 0.25-4.5, bringing the aqueous solution into contact with an organic solvent solution prepared by diluting an extracting reagent containing a monoalkylphosphoric acid and/or a dialkylphosphoric acid and a trialkylphosphoric acid in 1:2-5 by volume ratio with a phase-stabilizing water-immiscible organic solvent to extract the indium ions in the organic solvent solution and then bringing the organic solvent solution into contact with an aqueous sulfuric acid-acidic solution containing 100-500 g/liter free sulfuric acid to back-extract the indium ions into the aqueous sulfuric acid-acidic solution to provide an indium concentrate.

2. The process as claimed in claim 1 wherein the pH of an aqueous solution containing indium ions is adjusted to 0.25-1.5.

3. The process as claimed in claim 1 wherein the pH of an aqueous solution containing indium ions is adjusted to 0.25-1.0.

4. The process as claimed in claim 1 wherein the dialkylphosphoric acid is di(2-ethylhexyl)phosphoric acid.

5. The process as claimed in claim 1 wherein the trialkylphosphoric acid is tributylphosphoric acid.

6. The process as claimed in claim 1 wherein the phase-stabilizing water-immiscible organic solvent comprises one or more of aliphatic hydrocarbons, aromatic hydrocarbons or alkylaromatic hydrocarbons.

* * * * *